United States Patent

[11] 3,627,876

| [72] | Inventor | Jean Paul Choay<br>Neuilly-sur-Seine, France |
|---|---|---|
| [21] | Appl. No. | 713,322 |
| [22] | Filed | Mar. 15, 1968 |
| [45] | Patented | Dec. 14, 1971 |
| [73] | Assignee | Laboratoire Choay<br>Paris, France |
| [32] | Priority | Mar. 16, 1967 |
| [33] | | France |
| [31] | | 99032 |

[54] METHOD OF RELIEVING PAIN UTILIZING RIBONUCLEASE
17 Claims, No Drawings

| [52] | U.S. Cl. | 424/94 |
|---|---|---|
| [51] | Int. Cl. | A61k 19/00 |
| [50] | Field of Search | 424/94 |

[56] References Cited
UNITED STATES PATENTS

| 3,004,893 | 10/1961 | Martin | 424/94 |
|---|---|---|---|
| 3,061,512 | 10/1962 | Anderson et al. | 424/94 |

OTHER REFERENCES

The Merck Index, 7th Ed, (1960) pp. 117,711,712 1021
Chem. Abst. (1). 67- 81050 Z (1967). (2). 67- 71295 U (1967).

*Primary Examiner*—Stanley J. Friedman
*Attorney*—Wenderoth, Lind and Ponack

ABSTRACT: Painful pathological conditions which are totally free of inflammation can be relieved by the application of an effective quantity of ribonuclease as analgetic agent.

METHOD OF RELIEVING PAIN UTILIZING RIBONUCLEASE

Ribonuclease is known to have anti-inflammatory action. The present invention involves a new and unobvious use of ribonuclease, namely as an antialgic (analgesic), the action of which is independent of the anti-inflammatory activity of the ribonuclease. Otherwise stated, whereas ribonuclease has heretofore been used for pathological conditions involving inflammation, the present invention makes possible the treatment of painful conditions by ribonuclease-containing compositions in pathological conditions which are totally free of inflammation.

Accordingly, the present invention relates to a new and unobvious use of ribonuclease, namely, as an antialgic (analgesic) and to therapeutic compositions containing ribonuclease as sole or principal analgetically active agent.

Ribonuclease is an enzyme, also known scientifically as "-polyribonucleotide-2-oligonucleotidotransferase," the molecular structure of which, composed of 124 amino acids, is well known. It is a relatively thermostable enzyme, the activity of which is highly specific: ribonuclease hydrolyzes ribonucleic acid with formation of clearly defined nucleotides.

In addition to this fundamental biochemical property, ribonuclease is known to possess an important anti-inflammatory activity: thus, it has been shown that it has an activity on the first stages of inflammation.

According to the present invention, ribonuclease is employed, advantageously in association with a pharmaceutical vehicle, as an analgesic, its analgetic activity being wholly independent from its aforesaid anti-inflammatory activity.

In accordance with one advantageous embodiment of the invention, ribonuclease is incorporated, as active analgesic agent, into a therapeutic composition which can be used topically in the form of e.g. an ointment (pomade) wherein the said active agent is associated with suitable excipients.

In one advantageous form of the topically applicable embodiment, the ribonuclease can be associated with a rubefacient, which produces hyperemia.

In another advantageous form of topically applicable embodiment, the ribonuclease can be associated with an anti-inflammatory agent.

In a third advantageous form of topically applicable embodiment, the ribonuclease can be associated with another analgetic agent, the activity of which is potentiated by the ribonuclease.

According to a fourth advantageous form of topically applicable embodiment, the ribonuclease can be associated with an anti-infectious agent.

Alternatively, the ribonuclease, for the purpose of realizing the analgetic activity according to the invention, can be employed in the form of an injectable solution of ribonuclease. In this connection, the injectable solution of ribonuclease can be constituted by crystallized ribonuclease, dialyzed, lyophilized, dissolved in a compatible (apyrogenic) isotonic salt (chloride) solution. In this injectable form of realization of the invention, the ribonuclease can be associated with other therapeutically active agents, such as anti-inflammatory agents, anti-infectious agents, etc.

Further, the ribonuclease, for achieving the analgesia object of the invention, can be employed as an orally administrable composition, in the form of compressed pills or tablets, dragees, gels, etc., which may comprise additional therapeutically useful agents as previously enumerated and which can be provided with enteric coatings.

I. PREPARATION OF EMBODIMENTS ENABLING REALIZATION OF NEW USE OF RIBONUCLEASE FOR ANALGESIC PURPOSES.

Preparation of Ribonuclease

The ribonuclease can be obtained in the crystalline form from beef pancreas, by employing a modified Kunitz method [cf. M. Kunitz, J. Gen. Physiol., Vol 24 (1940) 15].

Preparation of Ribonuclease-Containing Injectable Solutions

An injectable solution of ribonuclease is prepared, for example as follows:

| | |
|---|---|
| Crystalline ribonuclease, dialyzed, lyophilized | 40 u. AE |
| Solvent: apyrogenic isotonic salt solution | 5 ml. |

It is advantageous to prepare such solution as required. If desired, other therapeutically useful agents, such as anti-inflammatory agents, anti-infectious agents, etc., can be preliminarily added to the crystalline ribonuclease, or preliminarily dissolved in the solvent.

Preparation of Ribonuclease-Containing Ointment

These are prepared according to procedures per se well known in the pharmaceutical art.

According to one advantageous embodiment of such pomades, there is embodied the following composition:

| | |
|---|---|
| Ribonuclease | 2500 u. AE |
| Rubefacient such as ethyl nicotinate | 0.5 to 1. g. |
| Polyoxyethyleneglycol 1,540 q.s. | |
| Polyoxyethyleneglycol 300 q.s. | 100 g. | or, according to another embodiment, the following composition:

| | |
|---|---|
| Ribonuclease | 2,500 u. AE |
| Hydrocortisone | 0.5 g. |
| Rubefacient such as ethyl nicotinate | 0.5 g. |
| Polyoxyethyleneglycol 1540 q.s. | |
| Polyoxyethyleneglycol 300 q.s. | 100 g. |

Preparation of Tablets and the Like Containing Ribonuclease

One embodiment of such a composition is as follows:

| | | |
|---|---|---|
| Ribonuclease, crystallized, lyophilized | | 20 u. AE |
| Excipients | q.s. | 120 mg. |
| Enteric coating (optional) | q.s. | 245 mg. |

Without intending to be limited thereto, the enteric coating can have the following composition:

| | |
|---|---|
| isopropyl alcohol | |
| officinal white sugar | |
| powdered gum arabic | |
| talc | |
| officinal gelatin | |
| cochineal | |
| Yellow Orange S | Q.S. tablet of 245 mg. |
| white wax | |
| spermaceti | |
| rectified ether | |
| ethyl acetate | |
| gum sandarac | |
| cellulose acetophthalate | |
| ethyl phthalate | |
| mastic | |

The pills, tablets, dragees, etc. can also contain, associated with the ribonuclease, other active ingredients, particularly anti-inflammatory agents, analgetic agents, anti-infectious agents, etc.

According to another embodiment, nonlimitative, of tablets according to this invention, the following composition is prepared:

| | |
|---|---|
| Ribonuclease | 10 u. AE |
| Bacitracin | 200 u/tablet |
| Ascorbic acid | 20 g. |
| Aromatized citron excipients | 1 g. |

II. PHYSICOCHEMICAL AND BIOCHEMICAL PROPERTIES OF RIBONUCLEASE

Ribonuclease is a white powder. It is stable in acid medium and its optimal activity is at about pH 7; however, it is active between pH5 and pH9. It is soluble in water to 1 percent. Its loss in weight on drying at 60° C. and at a pressure of 5 mm.Hg is about 10 percent.

In aqueous solution, ribonuclease has a UV-absorption maximum at 278 m$\mu$ ±2.

Ribonuclease is characterized by its hydrolytic action on 2″, 3″-cyclic pyrimidine nucleotides which it converts into 3″-pyrimidine nucleotides. The enzymatic activity of ribonuclease is measured by determination of the acid equivalent liberated, with the aid of the titrated quantity of sodium hydroxide required to maintain the pH constant. The unit of enzymatic activity (u. AE) defined by the Union Internationale de Biochimie, corresponds to a micromole of substrate hydrolyzed per minute, the substrate being constituted by a solution of barium cytidilate in a concentration of 56 milligrams per 10 milliliters of doubly distilled water.

III. PHARMACOLOGIC STUDY OF THE ANALGESIC ACTIVITY OF RIBONUCLEASE-CONTAINING THERAPEUTIC COMPOSITIONS ACCORDING TO THIS INVENTION

A. Toxicity

Acute Toxicity

Ribonuclease was administered intravenously to white mice, male, weighing 20 grams on the average, and also subcutaneously or intraperitoneally to male rats.

It has not been possible to determine the lethal dose 100 with male mice intravenously, but is probable that the $LD_{50}$ is at about 5g./kg., a dose which causes the death of 9 mice out of 20.

No toxicity of ribonuclease on the rats, even at a dose of 2.5 g./kg. intraperitoneally, could be observed.

B. Study of the Local Tolerance of Ribonuclease-Containing Therapeutic Compositions According to this Invention The study of the local tolerance of ribonuclease in the form of an ointment was carried out on the rat and the rabbit for 8 and 12 weeks, respectively.

With the rat, this study was made comparatively between the ribonuclease-based, i.e. ribonuclease-containing, ointment and the excipient. After 8 weeks of treatment, there has been observed no change in general state, in the weight curve, in the number of red corpuscles or in leucocyte count in the test animals. No deaths occurred in the tested or control animals. The skin tolerance on repeated application of this ointment or its excipient was excellent and this tolerance has been confirmed by comparative histological study of untreated pieces of skin, pieces treated with excipient, and pieces treated with ribonuclease-based ointment. The histological examination has shown no injury to the epidermis, the dermis or the hypodermis. Moreover, the liver, spleen and suprarenals remain histologically identical in the test animals and in the controls.

The perfect tolerance to repeated application of the ribonuclease-containing ointment was confirmed by study with the rabbit for 12 weeks. This study, made comparatively with that of the excipient, showed no change in the general state, in the weight curve and in the constitution of blood which would be indicative of intolerance to the treatment. The tegumentary tolerance was excellent and has been confirmed by histological examination of different skin fragments which were treated respectively with the excipient and the ribonuclease-containing ointment and, for comparison, of untreated skin fragments. The general tolerance has also been very good since the liver, spleen, kidneys and suprarenals remained histologically identical in the treated animals as in the controls.

C. Study of Analgesic Action of Therapeutic Compositions Containing Ribonuclease According to This Invention $C_1$ Local Analgesic Action of a Solution of Ribonuclease.

This study was carried out with solutions of ribonuclease in isotonic salt solution, prepared as required, with titers of 1.25, 2.5 and 5 percent, which were administered by injection to white mice, male, adult, weighing 22 grams on the average, subdivided into three groups of 40 each and one group of 20; one of the groups served as a control group and received only isotonic salt solution. Each animal was administered 0.03 ml. of liquid in the plantar tissue of the 4 paws, 30 minutes after having determined its reaction time, and the increase in reaction time of each animal was then determined by applying the Eddy test which consists in provoking a nociceptive stimulation by exposing the animal to a plate heated to 56° C.; the reaction time of the animal is then noted, rendered objective by licking of the front paws or trying to escape from the heat (jumping, bounding): it has been noted that regardless of the concentration of the solution of ribonuclease, the reaction time of the animal is always increased 15 minutes after the administration into the plantar tissue, while in the control animals there is no change in reaction time. It can thus be concluded from the results obtained by the Eddy test that ribonuclease in solution in isotonic salt solution possesses definitive analgesic properties.

$C_2$ Analgesic Action of Ribonuclease-Containing Ointment.

This study was carried out with a ribonuclease-based (ribonuclease-containing) ointment, the concentration of ribonuclease, as active ingredient, in which was about 0.50 percent, and its analgesic action was compared with its excipient, on the one hand, and with a propanocaine ointment (concentration of active substance of about 1.5 percent) on the other hand.

Tests were carried out by a technique like that of Carrol and Lim (Arch. Intern. Pharm. 1960, 125, 383) which consisted in determining changes brought about by the application of the ointments being tested, at certain thresholds of response to an electric stimulus. It is thus possible to show the analgesic action at the three principal thresholds by the routes of transmission of pain influx, namely, a peripheral or medullary threshold, a mesencephalic threshold and a hyphothalamo-thalamo-rhinencephalic threshold.

Only the first two thresholds of the transmission of pain influx have been included in the analgesic study of ribonuclease-containing ointments according to the present invention: the ointment was applied, at a dose of 400 to 500 mg. per application, which represents 10 to 12.5 u. AE of ribonuclease per application, male, adults, weighting 280 to 300 grams divided into three groups of eight each, of which only the first group was subjected to application of the ribonuclease-containing ointment, the second group receiving application of only the excipient, and the third group receiving application of the propanocaine ointment.

The ointment according to the present invention has an analgesic activity at the said two thresholds of reactivity: these increase continuously in time and the action of the ointment is very distinct relative to that of the excipient; in addition, as regards the mesencephalic threshold, a comparison with propanocaine ointment shown the ribonuclease-containing ointment is more active than the latter.

$C_3$ Analgesic Action of an Injectable Solution of Ribonuclease.

The study of changes in threshold reactivities was made with vials of lyophilized ribonuclease corresponding to the following formulation:

| | |
|---|---|
| Ribonuclease, crystalline, dialyzed, lyophilized | 40 u. AE |
| Apyrogenic isotonic salt solution | 5 ml. |

The product was administered intravenously; two groups of animals received 16 u. AE/kg. and 64 u. AE/kg. respectively, and the results were compared with those obtained with a control group.

The obtained results corroborate those obtained with the ointment: the peripheral or medullary and mesencephalic thresholds of reactivity are raised significantly; the elevation continues during the entire duration of the test.

C₄ Analgesic Action of Pressed Products Containing Ribonuclease.

All three thresholds of reactivity were considered in this study. These thresholds were determined under the same conditions as those employed for the aforedescribed tests, employing for such determinations, either ribonuclease alone, or ribonuclease associated with trypsin and with chymotrypsinogen in the form of powder, or finally a gastro-resistant dragee.

The substances are introduced by the duodenal route in aqueous suspension in gum Senegal.

The following doses were administered:
- a. ribonuclease alone     20 u. AE/kg.
- b. ribonuclease associated with trypsin    about 32.3 mg./kg. which corresponds to 20 u. AE/kg. of ribonuclease
- c. dragee, 1 dragee per animal, i.e. 80 u. AE/kg. of ribonuclease.

This study shown essentially that the product, administered in the indicated form, exerts a local analgesic effect by elevation of the axone reflex (first peripheral or medullary threshold), and it has an action at the highest level of integration of the pain stimular (third hypothalamo-thalamo-rhinencephalic threshold).

IV CLINICAL STUDY OF ANALGESIC ACTIVITY OF RIBONUCLEASE-CONTAINING THERAPEUTIC COMPOSITIONS ACCORDING TO THIS INVENTION

A. Therapeutic Activity of Ribonuclease-Containing Ointment

The therapeutic activity of the ribonuclease-based ointment of the invention was studied in connection with disorders presenting at the same time an inflammatory state, and a state of pain, more especially in connection with sprains, contusions (bruises), ecchymoses, pain due to arthroses, as well as in connection with pain due to aftereffects of luxations (dislocations) and various types of fractures, nontraumatic joint pains, subchronic lymphangitis, superficial phlebitic and periphlebitic conditions after prolonged intravenous transfusions, etc.

1. ACTION ON SPRAINS AND TRAUMATIC CONTUSIONS

The study of the local action of ribonuclease-containing ointment shows that it possesses a significant antipain efficacy to pain arising from a blow and also on appreciable antiphlogistic action on secondary edema. This very satisfactory action can be evaluated on the basis of:

a. the subjective state of the injured individual himself. Some of the patients have gone as far as to characterize the results as "remarkable" or "spectacular", on the basis of comparison with the history of a sprain of the same type suffered in recent months or years and treated differently. There is realized, as soon as the ointment is applied, a true local analgesic effect extending throughout the entire zone treated. The duration of this action varies in accordance with the type of lesion, the seriousness thereof, and the sensitivity of the patient. It is never less than 1½ to 2 hours, and generally is much longer (6 to 7 hours). Application three times a day is sufficient as a general rule to obtain a permanent effect. There is achieved a deep subcutaneous analgesia without true anesthetic effect at the level of the skin;

b. the possibility of rapidly recovering normal functioning, in particular of ability to walk, in case of tibiotersal sprains. From the 2nd or 3rd day, even in the case of serious ligamentary lesions (as evidenced by ecchymosis and the resultant painful ligamentary points), walking can be resumed. Some treated patients, members of the Institut Regional d'Education Physique et du Sports (in preparation for professorships in physical education) were able rapidly to resume their physical activities.

c. The disappearance of periarticular edema is also in general a constant and rapid phenomenon (in 2 to 5 days at the most).

1a SPRAINS

Sprains of the external and internal tibiotarsal joints treated for 5 to 7 days by massage, three times each day, with ribonuclease-containing ointment according to this invention has shown the rapid and distinct efficacy of such ointment to effect the disappearance of painful objective points and of the pain itself and to effect distinct regression of residual edema, rapid resumption of the physical activity of the patients being made possible.

1b Articular Contusions Resulting from Blow or Crushing.

A simple but fairly serious contusion of the left knee, without articular localized lesion of the bone or ligament, treated by thrice daily application of the ribonuclease-containing ointment, started 18 hours after the accident, is relieved of pain within 48 hours. The treatment, giving such excellent result, obviates pain and contusional edema.

An injured victim of the crushing of the right-hand instep, without bony lesion, was subjected for 11 days to three times daily massage of the foot with the ribonuclease-containing ointment according to the invention; after 3 days of treatment, a distinct diminution of pain is noted and substantially normal walking is again possible. On the 11th day of the treatment: a total disappearance of edema, foot still slightly painful on walking but not when at rest. The patient is again able to wear shoes normally.

(1c). CONTUSIONS OF SOFT PARTS.

The treatment of stretched muscles by massaging the injured area several times daily with ribonuclease-containing ointment according to this invention results in an absolutely characteristic analgesic effect: the pain yields upon application of the ointment and this analgesic effect lasts for 1½ hours; if the sensation of pain reappears, it will yield again on further application of the ointment. After 48 hours of treatment, there is a clear improvement.

2. ACTION ON RHEUMATISMAL PAINS OF THE SMALL AND MEDIUM JOINTS (ARTHROSES)

The application, two or three times daily, of ribonuclease-containing ointment according to this invention, for 5 to 6 hours, at the painful joints of arthrosic patients, of arthritic patients and of patients subject to rheumatismal joint pains, results in a rapid analgesic action on the painful phenomena treated, and in an anti-inflammatory action which becomes apparent more slowly but is permanent.

3. ACTION ON LYMPHANGITES AND ON VENOUS AND PERIVENOUS INFLAMMATORY STATES.

In cases of venous reanimation by perfusion, inflammation-causing accidents frequently occur either at the point of injection or at greater or less areas of the member which is the site of the transfusion, and these inflammatory accidents can take the form of redness around the point of injection, of edema accompanied by redness and pain, of more or less serious induration of the venous system, of lymphangitic trails along the venous path and of lymphangites.

The local application of ribonuclease-containing ointment according to the invention, three or four times a day for 7 to 10 days depending upon the seriousness of the inflammatory accident, causes a disappearance of the pain after the third application of the ointment, a disappearance of edema and redness at the end of 2 to 3 days; the lymphangites and lymphangitic trails disappear towards the 5th day of treatment, while venous indurations disappear at about the 7th to 10th day of treatment.

In all the clinical observations made of inflammatory accidents following reanimation of veins by transfusion, the tolerance of the ribonuclease-containing ointment according to the invention was good.

4. ACTION ON INFLAMMATORY STATES FOLLOWING THE OPERATION OF STRIPPING OF VARICES.

The stripping of varix veins is frequently accompanied by the appearance of hematomae, particularly in the positioning of a suction drain on the thigh, at the point of such positioning, this being accompanied by local pain with edema and the sensation of tension. Massaging with ribonuclease-containing ointment according to this invention at the rate of three applications per 24 hours for 7 to 12 days, depending upon the seriousness of the postoperative phenomenon, results in a rapid disappearance of pain, while postoperative hematomae regress somewhat more slowly but disappear between the 7th and 12th days; tension due to edema regresses rapidly at the same time as the pain.

B. Therapeutic Activity of an Injectable Solution of Ribonuclease.

Use is made of an injectable solution of ribonuclease to treat conditions of pain, where the site is not accessible to local treatment or is accessible only with difficulty. The action of injectable solution of ribonuclease thus extends to the treatment of all painful conditions, regardless of their origin.

The two clinical studies hereinafter reported are given solely by way of example and are not at all intended to be limitative; they are intended to illustrate the general therapeutic efficacy of the treatment of states of pain by injection according to this invention.

In a case of pleuro-pulmonary cancer (epithelioma) accompanied by permanent thoracic pains with superintense crises aggravating dyspnea and preventing rest and sleep not withstanding large doses of morphine, a treatment with an injectable solution of ribonuclease, at the rate of two ampuls of 10 mg. of ribonuclease dissolved in 5 mg. of apyrogenic isotonic salt solution, by daily slow intravenous injections, for 21 days, resulted in a regression of the intensity of the pain, making it possible to reduce and finally to discontinue the administration of stupefacients. The pain had practically disappeared on the 10th day of treatment.

In a case of traumatic hemarthrosis of the knee (skiing accident) with fracture of the kneecap in which, notwithstanding several suction punctures, with persistent great pain rendering the knee wholly functionally impotent, a treatment with an injectable solution of ribonuclease, at the rate of one ampul of ribonuclease (dissolved in a concentration of 50 u. AE in 5 mg. of apyrogenic isotonic salt solution), by slow intravenous injections, two times a day, for 10 days, resulted in a reduction of pain beginning with the 2nd day, with complete disappearance from the 5th day on. Careful mecanotherapy was then begun, and continued carefully, so that a complete functional recovery was finally achieved.

C. Therapeutic Activity of Pressed Products, Tablets, Etc. Containing Ribonuclease.

The indications with respect to orally administrable ribonuclease are essentially the same as those for the other forms of administration of the latter and extend to all conditions of pain, regardless of their origin.

The three clinical studies hereinafter reported are given solely by way of example and are not at all intended to be limitative; they are intended to illustrate the general therapeutic efficacy of the treatment of states of pain by oral administration according to this invention.

In a case of complex fracture of the right shoulder (fracture of the omoplate and fracture of the clavicle) requiring the pinning of the latter and involving gross functional impotence and permanent pain, the taking of three dragees of ribonuclease per 24 hours for 9 days resulted in total disappearance of the pain from the 4th day on, as well as a reduction in traumatic inflammatory edema.

In a case of chronic hydrarthosis of the knee accompanied by pain, edema and limitation of bending and extending movements (syrectomia), the taking of one ribonuclease-containing dragee every 8 hours, for 10 days, results in an early recovery of functional activity from the 3rd day on, due to complete disappearance of pain. Bending and extensional movements are normal from the 5th day on.

In a case of subchronic pharyngitis, with dyspnea accompanied by painful satellite cervical adenopathy and fever, the administration of one compressed sucking composition (so-called "sucker"), containing ribonuclease according to this invention, every 3 hours, results—at the end of 24 hours—in an improvement of the syndrome (disappearance of the dysphagia and painful adenopathy). Recovery was apparent from the 4th day on.

V. INDICATIONS

The analgesic ribonuclease-containing therapeutic compositions employed according to this invention are particularly indicated for the treatment of algias of diverse origins, their action on the latter being rapid and definitive.

VI. ADMINISTRATION

The analgesic ribonuclease-containing therapeutic compositions can according to this invention be administered in a variety of forms and, in particular:

in the form of ointments, in the form of injectable and drinkable solutions, in the form of suspensions in a liquid which is volatile at ordinary temperatures, in the form of suppositories, in compressed form, as tablets, pills, dragees, granules, gelatin products, etc., wherein the content of ribonuclease varies from 0.1 to 10 percent by weight.

It is clear from the foregoing that, whatever the mode of administration or application of the ribonuclease according to the invention, analgesic effects are realized with the advantage of the use, for the realization of such effects, of an enzymatic antialgic with no contraindications.

Recapitulating, this invention makes possible the relief of pain in a patient (human) suffering from pain, and particularly in cases where the pain is not associated with inflammation, by administering to the patient an analgesically effective amount of ribonuclease. The latter is conveniently administered by ribonuclease-containing ointment where topical application is involved, by injection (e.g. intravenous injection) where the locus of the pain is relatively inaccessible, and orally—e.g. as drinkable solution or as tablets, pills and the like—where this mode of administration appears best suited to the situation. Daily doses vary with the character and seriousness of the pain source, as does the length of time during which the administration is continued. Generally speaking, nontopical administration is made in unit doses which contain about 0.5 milligram of ribonuclease per kilogram of body weight of the patient.

What is claimed is:

1. A method of treating a condition of pain in the absence of inflammation in a human suffering from such condition, which consists essentially of subjecting the locus of the pain to the analgesic action of a pain-relieving amount of ribonuclease.

2. A method according to claim 1, wherein the ribonuclease is the active ingredient of a therapeutic composition consisting essentially of ribonuclease and a pharmaceutically acceptable carrier therefor.

3. A method according to claim 2, wherein the composition is in the form of an ointment which is topically applied to the locus of pain and adjacent areas.

4. A method according to claim 2, wherein the composition is in the form of an injectable solution of ribonuclease which is administered by injection.

5. A method according to claim 2, wherein the composition is in the form of an injectable solution of ribonuclease which is administered by intravenous injection.

6. A method according to claim 2, wherein the composition is in the form of a drinkable solution of ribonuclease which is administered orally.

7. A method according to claim 2, wherein the composition is in the form of an orally administrable compressed pill, tablet dragee, uncoated granules, coated granules and gels.

8. A method according to claim 2 wherein the composition is formed according to the following recipe:

| | |
|---|---|
| ribonuclease | 2500 u. AE, |
| rubefacient | 0.5 to 1 gram, |
| polyoxyethyleneglycol | 100 grams. |

9. A method according to claim 8, wherein the rubefacient is ethyl nicotinate.

10. A method according to claim 2 wherein the composition is formed according to the following recipe:

| | |
|---|---|
| ribonuclease | 2500 u. AE, |
| hydrocortisone | 0.5 gram |
| rubefacient | 0.5 to 1 gram |
| polyoxyethyleneglycol | 100 grams |

11. A method according to claim 10, wherein the rubefacient is ethyl nicotinate.

12. A method according to claim 2 wherein the composition is formed according to the following recipe:

| | |
|---|---|
| ribonuclease, crystalline, dialyzed lyophilized | 40 u. AE, |
| apyrogenic isotonic salt solution | 5 milliliters |

13. A method according to claim 2 wherein the composition is formed according to the following recipe:

| | |
|---|---|
| ribonuclease, crystalline, lyophilized | 20 u. AE |
| excipient | 120 milligrams |

14. A method according to claim 2 wherein the composition is formed according to the following recipe:

| | |
|---|---|
| ribonuclease, crystalline, lyophilized | 20 u. AE |
| excipient | 120 milligrams |
| gastro-resistant coating | 245 milligrams |

15. A method according to claim 2 wherein the composition is formed according to the following recipe:

| | |
|---|---|
| ribonuclease | 20 u. AE |
| trypsin | 200 u. AE |
| chymotrypsinogen corresponding to | 2000 u. AE |
| excipient | 120 milligrams |
| gastro-resistant coating | 245 milligrams |

16. A method according to claim 2 wherein the composition is formed according to the following recipe:

| | |
|---|---|
| ribonuclease | 20 u. AE |
| tetracycline | 250 milligrams |
| excipient | 120 milligrams |
| gastro-resistant coating | 245 milligrams |

17. A method according to claim 2 wherein the composition is formed according to the following recipe:

| | |
|---|---|
| ribonuclease | 10 u. AE |
| bacitracin | 200 u./tablet |
| ascorbic acid | 20 milligrams |
| excipient | 1 gram |

* * * * *